United States Patent
Tanaka (10) Patent No.: US 10,877,598 B2
(45) Date of Patent: Dec. 29, 2020

(54) CONTROLLER, CONTROL METHOD, AND INPUT APPARATUS

(71) Applicant: DENSO TEN Limited, Kobe (JP)

(72) Inventor: Takashi Tanaka, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/963,687

(22) Filed: Apr. 26, 2018

(65) Prior Publication Data
US 2019/0025983 A1    Jan. 24, 2019

(30) Foreign Application Priority Data
Jul. 19, 2017 (JP) .................................. 2017-140344

(51) Int. Cl.
*G06F 3/041*     (2006.01)
*G06F 3/0488*    (2013.01)
*G06F 3/01*      (2006.01)
*B60K 37/06*     (2006.01)

(52) U.S. Cl.
CPC ............ *G06F 3/0418* (2013.01); *B60K 37/06* (2013.01); *G06F 3/016* (2013.01); *G06F 3/04883* (2013.01); *B60K 2370/143* (2019.05); *B60K 2370/158* (2019.05); *B60K 2370/199* (2019.05)

(58) Field of Classification Search
CPC .... G06F 3/016; G06F 3/0418; G06F 3/04883; B60K 37/02
See application file for complete search history.

(56) References Cited

U.S. PATENT DOCUMENTS

| | | | | |
|---|---|---|---|---|
| 2016/0162113 | A1* | 6/2016 | Araki ...................... | G06F 3/016 345/173 |
| 2017/0336891 | A1* | 11/2017 | Rosenberg ............ | G06F 3/0412 |
| 2018/0356926 | A1* | 12/2018 | Park ........................ | G06F 3/016 |
| 2019/0050073 | A1* | 2/2019 | Murakami ............. | B60R 16/02 |

FOREIGN PATENT DOCUMENTS

| | | | | |
|---|---|---|---|---|
| EP | 3422156 | A1 * | 1/2019 | ............. B60R 16/02 |
| JP | 2012-155630 | A | 8/2012 | |
| JP | 2012-226478 | A | 11/2012 | |
| JP | 2014-216024 | A | 11/2014 | |
| JP | 2016-146035 | A | 8/2016 | |
| WO | 2014/125857 | A1 | 8/2014 | |

* cited by examiner

*Primary Examiner* — Kent W Chang
*Assistant Examiner* — Andrew Lee
(74) *Attorney, Agent, or Firm* — Oliff PLC (57) ABSTRACT

A controller according to one aspect of an embodiment includes: a position detecting unit; an operation detecting unit; a vibration controlling unit; and a correction unit. The position detecting unit detects a touch position on an operation surface. The operation detecting unit detects a touch operation on the operation surface. The vibration controlling unit controls and causes one or more vibration elements to vibrate the operation surface. The correction unit corrects, on the basis of the touch position on the operation surface, at least one of detection of the touch operation performed by the operation detecting unit and vibration of the operation surface caused by the vibration controlling unit.

18 Claims, 5 Drawing Sheets

CONTROLLER, CONTROL METHOD, AND INPUT APPARATUS

CROSS-REFERENCE TO RELATED APPLICATION

This application is based upon and claims the benefit of priority of the prior Japanese Patent Application No. 2017-140344, filed on Jul. 19, 2017, the entire contents of which are incorporated herein by reference.

FIELD

The embodiment discussed herein is directed to a controller, a control method, and an input apparatus.

BACKGROUND

Conventionally, there has been known an input apparatus that provides a tactile sense to a user so as to cause the user to recognize reception of his/her input operation. This input apparatus generates, for example, when the user touches an operation surface, a vibration so as to cause the user to recognize reception of his/her input operation (see, e.g., WO 2014/125857).

However, the above-mentioned technology has room for improvement in enhancing operability of the user. For example, the above-mentioned technology generates the vibration in accordance with a distance between a vibration generator and a touch position. In this manner, the above-mentioned technology, ease of vibrating an operation surface is not taken into account. Thus, there exists possibility that a desired vibration is not able to be generated depending on the touch position, thereby leading to reduction in a user's operability.

SUMMARY

A controller includes: a position detecting units an operation detecting unit; a vibration controlling unit; and a correction unit. The position detecting unit detects a touch position on an operation surface. The operation detecting unit detects a touch operation on the operation surface. The vibration controlling unit controls and causes one or more vibration elements to vibrate the operation surface. The correction unit corrects, on the basis of the touch position on the operation surface, at least one of detection of the touch operation performed by the operation detecting unit and vibration of the operation surface caused by the vibration controlling unit.

BRIEF DESCRIPTION OF DRAWINGS

A more complete appreciation of the disclosed technology and many of the attendant advantages thereof will be readily obtained as the same becomes better understood by reference to the following detailed description when considered in connection with the accompanying drawings, wherein.

DESCRIPTION OF EMBODIMENT

Hereinafter, a controller, a control method, and an input apparatus disclosed in the present application will be described in detail with reference to the accompanying drawings. Moreover, an embodiment described below is merely one example, and not intended to limit the present disclosure.

1. Outline of Input Device

Figure 1A:
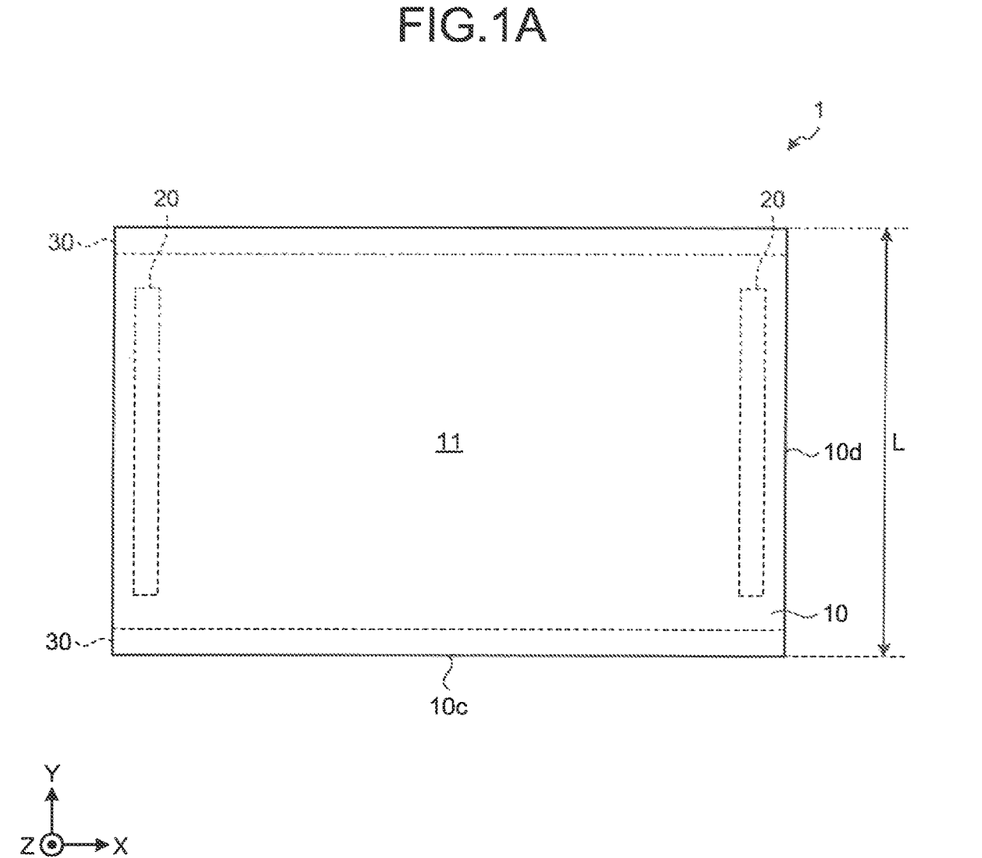
FIG. 1A is a plan view illustrating an input apparatus according to an embodiment.
Figure 1B:
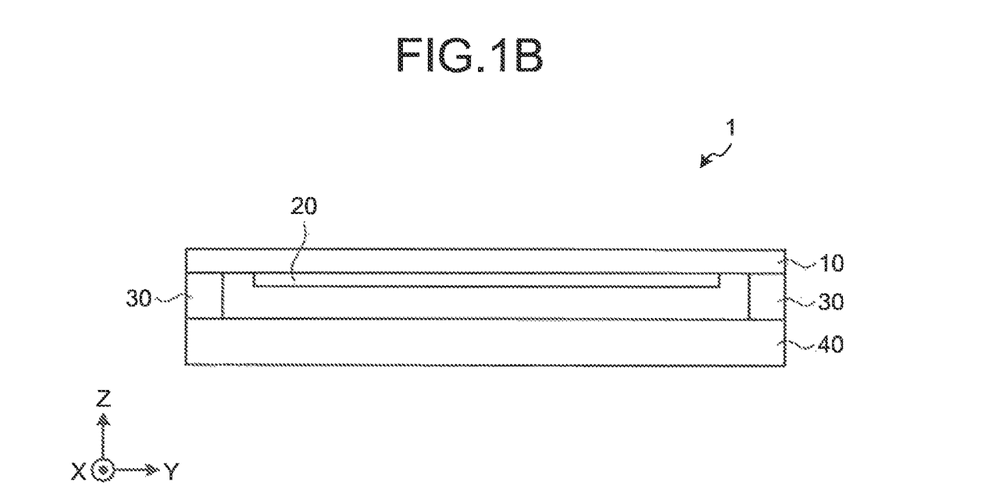
FIG. 1B is a side view illustrating the input apparatus according to the embodiment.

An outline of an input apparatus according to the embodiment will be explained with reference to FIGS. 1A and 1B. FIG. 1A is a plan view illustrating the input apparatus 1 according to the embodiment. FIG. 1B is a side view illustrating the input apparatus 1 according to the embodiment.

Figure 4:
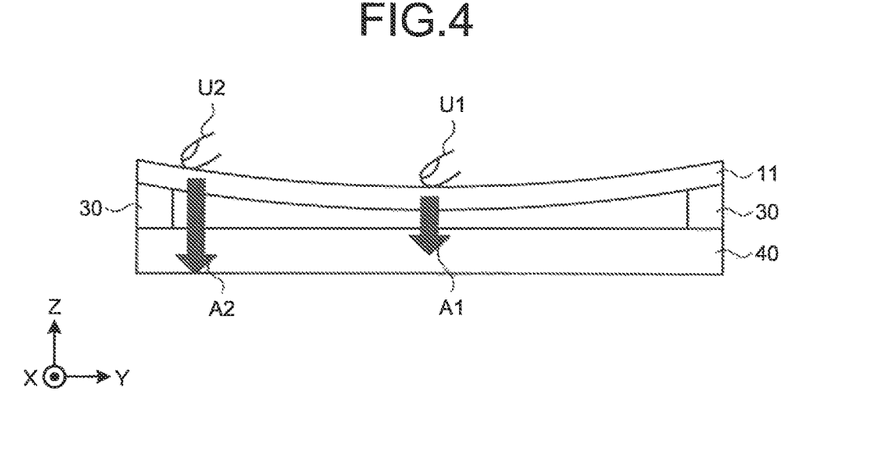
FIG. 4 is a diagram illustrating a relation between a touch position and a pressing force.

FIGS. 1A, 1B, 4, and the following are schematic diagrams. Therefore, a size and/or a shape of each configuration element illustrated in FIG. 1A etc. is not always precise. For convenience of comprehension, there exists in the accompanying drawings a case where each configuration element is indicated exaggeratedly. In FIGS. 1A and 1B, a three-dimensional orthogonal coordinate system including an X-axis, a Y-axis, and a Z-axis is depicted. This three-dimensional orthogonal coordinate system may be depicted in another drawing of the accompanying drawings.

As illustrated in FIGS. 1A and 1B, the input apparatus 1 is constituted of an operation panel 10, vibrators 20, holding parts 30, and a supporting panel 40. The input apparatus 1 is able to be used as a touch pad having a vibration function that vibrates an operation surface 11 of the operation panel 10 in accordance with, for example, a slide operation or a depression operation performed by a user, which is caused by control of a controller (not illustrated). The input apparatus 1 may be combined with a display, such as a liquid crystal display, and may be used as a touch panel having the vibration function.

The operation panel 10 is a plate-shaped member. Specifically, the operation panel 10 is a quadrilateral-shaped plate. More specifically, the operation panel 10 has a rectangular shape having short sides 10d of a length of "L" and long sides 10c. In FIG. 1A, the operation panel 10 is exemplified that a rectangular-shaped plate; however, a shape of the operation panel 10 is not limited to a rectangular shape, and may be any one of various shapes such as a round shape and a trapezoid shape.

The operation panel 10 has the operation surface 11 in a central region on its surface. The operation panel 10 includes, for example, an electrostatic-capacity-type touch censor (not illustrated). The controller detects a touch position of the user on the operation surface 11 on the basis of a detection result of the touch censor. For example, the user touches the operation surface 11 by using his/her finger or the like, or touches the operation surface 11 by using a stylus pen so as to perform a touch of the user on the operation surface 11.

Each of the vibrators 20 is a vibration element such as a piezoelectric element (piezo element). The plurality of vibrators 20 is arranged on the operation panel 10. In FIG. 1A, the number of the vibrators 20 is exemplified to be two; however, not limited thereto, the number of the vibrators 20 may be one or equal to or more than three.

The vibrators 20 are fixed and attached, by using adhesive agent etc., to respective vicinities of end portions close to the short sides 10d on a reverse surface that is reverse to the operation surface 11 of the operation panel 10, for example. The vibrators 20 vibrate the operation panel 10. For example, the controller controls the vibrators 20 to be able to vibrate the operation panel 10 in a plurality of modes having different vibration frequencies.

Specifically, the vibrators 20 vibrate the operation panel 10 at a high frequency within the ultrasonic band, or vibrates the operation panel 10 at a low frequency that is lower than the ultrasonic band in a state where a finger or the like of the user is in contact with the operation surface 11. Thus, it is possible to provide to the user a smooth tactual sense and a shaking tactual sense.

The holding parts 30 are fixed to, by using adhesive agent etc., and arranged in respective end portions close to the long sides 10c on the reverse surface of the operation panel 10 so as to hold the operation panel 10. In FIG. 1A, the number of the holding parts 30 is exemplified to be two; however, not limited thereto, the number of the holding parts 30 may be one or equal to or more than three.

The supporting panel 40 is arranged oppositely to the reverse surface of the operation panel 10 so as to support the operation panel 10 via holding parts 30.

The operation panel 10 according to the present embodiment is held by the holding parts 30 at the respective long sides 10c. Thus, ease of deformation and ease of vibration of the operation panel 10 differ depending on a position within the operation panel 10. For example, the operation panel 10 is hard to be vibrated in the vicinity of any of the holding parts 30 of the operation panel 10. On the other hand, the operation panel 10 is easy to be vibrated in the vicinity of the center of the operation panel 10.

Thus, when the user performs a depression operation of depressing the operation panel 10, the operation panel 10 is largely depressed by a small pressing force in the vicinity of the center of the operation panel 10, and thus the controller is able to detect the depression operation even when user's pressing force is small. On the other hand, in the vicinity of any of the holding parts 30, a depression amount does not reach a predetermined amount unless the user depresses the operation panel 10 with a large pressing force, and thus there exists a possibility that the controller is not able to detect user's depression operation.

There exists possibility that, the user is hard to feel the vibration in the vicinity of any of the holding parts 30, and the user conversely feels a needless large vibration in the vicinity of the center of the operation panel 10, when the vibrators 20 are vibrated at a constant driving voltage.

As described above, there exists possibility that variations occur, due to ease of deformation and ease of vibration of the operation panel 10, in detection of a depression operation and in vibration that is felt by the user.

Therefore, the controller included in the input apparatus 1 according to the present embodiment corrects, for example, at least one of an input operation such as a depression operation performed by the user and vibration of the operation surface 11 caused by the vibrators 20, on the basis of a touch position of the user on the operation surface 11. For example, the controller corrects at least one of an input operation such as a depression operation performed by the user and vibration of the operation surface 11 caused by the vibrators 20, on the basis of a touch position associated with a structure of the operation panel 10.

Specifically, the controller corrects a driving voltage to be applied to the vibrators 20 so that the driving voltage to be applied to the vibrators 20 is larger as a touch position is closer to any of the holding parts 30. The controller corrects a driving voltage to be applied to the vibrators 20 so that the driving voltage to be applied to the vibrators 20 is smaller as a touch position is closer to the vicinity of the center of the operation surface 11.

In a state where a driving voltage to be applied to the vibrators 20 is larger as a touch position is closer to any of the holding parts 30, the user can feel an appropriate vibration even when a finger or the like of the user is in contact with a portion in the vicinity of any of the holding parts 30, which is hard to be vibrated.

In a state where a driving voltage to be applied to the vibrators 20 is smaller as a touch position is closer to the vicinity of the center of the operation surface 11, the user can feel an appropriate vibration even when a finger or the like of the user is in contact with a portion in the vicinity of the center of the operation surface 11, which is easy to be vibrated.

Thus, the input apparatus 1 is able to provide to the user a constant vibration independently of user's touch position on the operation surface 11, so that it is possible to enhance operability of the user.

When a depression amount of the operation surface 11 exceeds a threshold value, in other words, when the operation surface 11 is bent by the threshold value or more, the controller detects a depression operation. In this case, the controller corrects the threshold value so that the threshold value is smaller as a touch position is closer to any of the holding parts 30. The controller corrects the threshold value so that the threshold value is larger as a touch position is closer to the vicinity of the center of the operation surface 11.

The threshold value is smaller as a touch position is closer to any of the holding parts 30, and thus the controller is able to detect a depression operation by a small depression amount. Therefore, the user is able to perform a depression operation even when he/she does not apply a large pressing force to the operation surface 11.

Furthermore, the threshold value is larger as a touch position is closer to the vicinity of the center of the operation surface 11, and thus the controller detects no depression operation unless a depression amount is large. Therefore, the controller detects a depression operation when the user depresses the operation surface 11 with a predetermined pressing force or more, so that it is possible to reduce an erroneous detection of a depression operation.

Thus, the controller is able to detect a depression operation when the user depresses the operation surface 11 with a predetermined pressing force, so that it is possible to reduce a detection failure and an erroneous detection of the depression operation, thereby leading to enhancement in operability of the user.

As described above, the controller corrects detection of a touch operation and vibration of the operation surface 11, which is on the basis of a touch position on the operation surface 11, and thus the input apparatus 1 including this controller is able to detect a touch operation performed by the user with a predetermined pressing force and to provide a predetermined vibration to the user, thereby leading to enhancement in operability of the user.

Here, the case has been explained in which the controller corrects both of detection of a touch operation and vibration of the operation surface 11; however, the controller may correct any one of the detection of the touch operation and the vibration of the operation surface 11.

2. Mounted Example of Electronic-Device System

Figure 2:
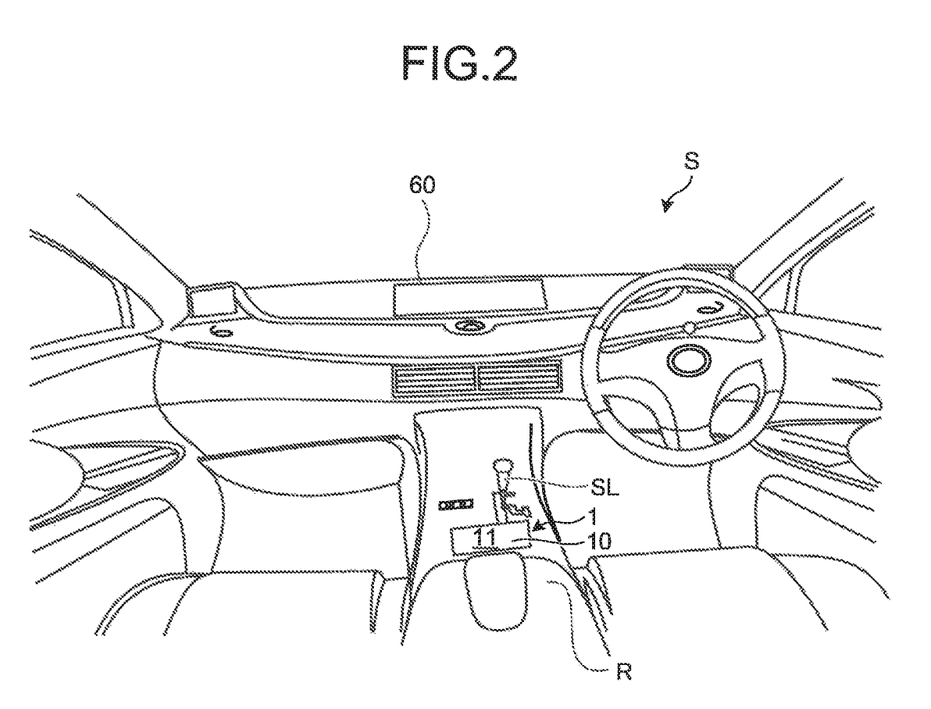
FIG. 2 is a diagram illustrating a mounted example of an electronic-device system including the input apparatus according to the embodiment.

FIG. 2 is a diagram illustrating a mounted example of an electronic-device system S including the input apparatus 1 according to the embodiment. As illustrated in FIG. 2, the electronic-device system S according to the present embodiment is mounted on a vehicle as one example.

The electronic-device system S includes the input apparatus 1 and a display 60. The input apparatus 1 is connected to on-vehicle devices such as the display 60 and a speaker via network communication so as to function as input apparatuses of these on-vehicle devices. The input apparatus 1 may be used as a touch pad as described above.

The operation surface 11 of the operation panel 10 is arranged at a position that can be easily reached for operation by a driver, such as a position close to a shifter SL provided in a center console. In the example illustrated in FIG. 2, the operation surface 11 is arranged between an armrest R and the shifter SL. Therefore, the user can operate the operation surface 11 with his/her arm placed on the armrest R. Thus, the user can easily operate the input apparatus 1 without changing his/her driving posture.

The on-vehicle devices include various devices such as the display 60 that displays a predetermined image, a speaker that outputs a predetermined sound, an air conditioner, and a car navigation system. Therefore, the user can operate these various devices by operating the input apparatus 1.

When receiving an input operation from the user, the above-mentioned input apparatus 1 generates a high-frequency vibration or a low-frequency vibration in the operation panel 10 in response to this input operation, so that it is possible to cause the user to recognize reception of his/her input operation.

3. Details of Input Apparatus

Figure 3:
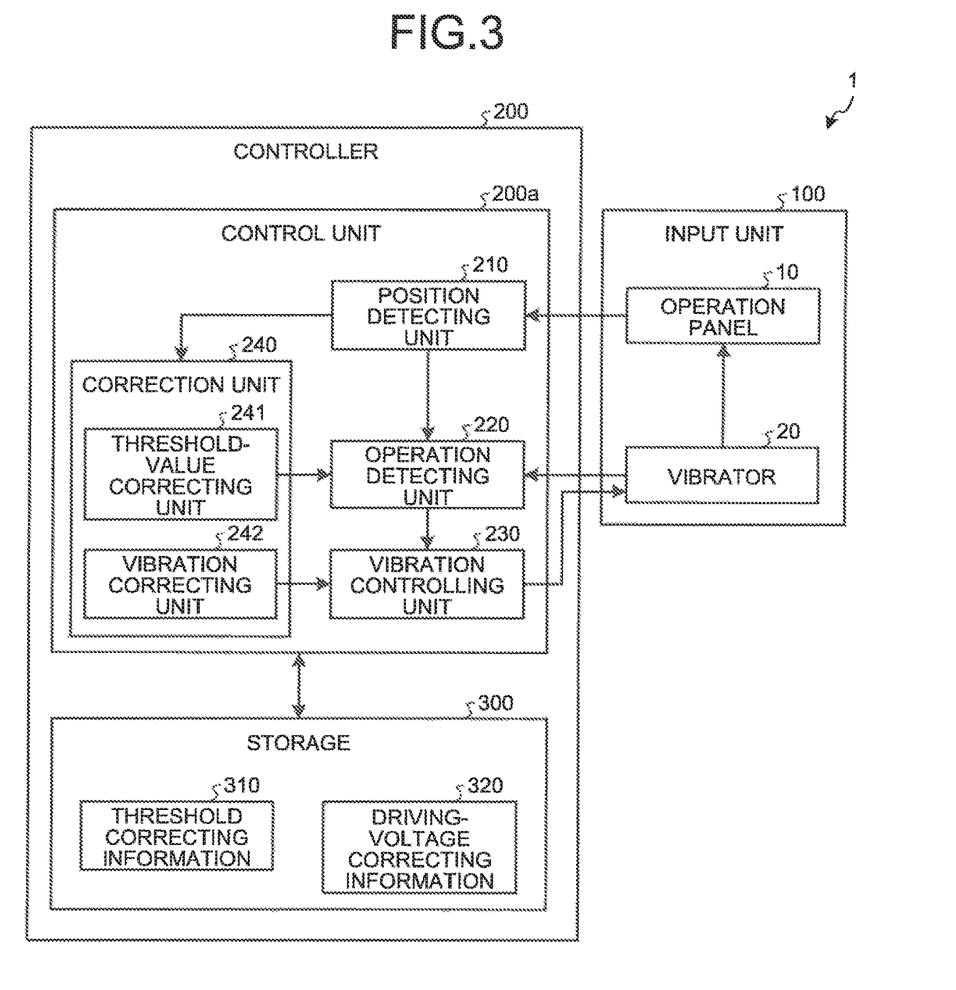
FIG. 3 is a block diagram illustrating a configuration of the input apparatus according to the embodiment.

Next, details of the input apparatus 1 according to the embodiment will be explained with reference to FIG. 3. FIG. 3 is a block diagram illustrating a configuration of the input apparatus 1 according to the embodiment. In FIG. 3, configuration elements needed for explaining features of the present embodiment are depicted by using functional blocks, and depiction of common configuration element(s) is omitted.

In other words, the configuration elements illustrated in FIG. 3 are functionally conceptual, and thus they are not to be physically configured as illustrated in the drawings. For example, specific forms of distribution and integration of the configuration elements are not limited to those illustrated in the drawings, and all or some of the devices can be configured by separating or integrating the apparatus functionally or physically in any unit, according to various types of loads, the status of use, etc.

As illustrated in FIG. 3, the input apparatus 1 includes an input unit 100 and a controller 200.

The input unit 100 includes the above-mentioned operation panel 10 and the above-mentioned vibrators 20. When receiving an input of the user via the operation surface 11, the operation panel 10 outputs a touch position on the operation surface 11 to the controller 200.

The vibrators 20 are vibrated in accordance with the control of the controller 200 so as to provide a predetermined vibration to the user. Any of the vibrators 20 operates also as a depression detecting unit or depression detecting units for detecting a depression amount when the user depresses the operation surface 11. Any of the vibrators 20 outputs or output the detected depression amount to the controller 200.

The controller 200 includes a control unit 200a and a storage 300.

The control unit 200a includes a position detecting unit 210, an operation detecting unit 220, a vibration controlling unit 230, and a correction unit 240. The control unit 200a includes: a computer including, for example, a Central Processing Unit (CPU), a Read Only Memory (ROM), a Random Access Memory (RAM), a Hard Disk Drive (HDD), and an input/output port among other things; and various circuits.

The CPU of the computer reads out and executes a program stored in the ROM, for example, so as to function as the position detecting unit 210, the operation detecting unit 220, the vibration controlling unit 230, and the correction unit 240 of the control unit 200a.

At least one or all of the position detecting unit 210, the operation detecting unit 220, the vibration controlling unit 230, and the correction unit 240 of the control unit 200a may be constituted of hardware such as an Application Specific integrated Circuit (ASIC) and a Field Programmable Gate Array (FPGA).

The storage 300 corresponds to the RAM and/or the HDD, for example. The RAM and the HDD are able to store threshold correcting information 310, driving-voltage correcting information 320, and various programs among other things.

The input apparatus 1 may acquire the above-mentioned program and/or various kinds of information via another computer connected to the input apparatus 1 by using a wired/wireless network, or a portable recording medium.

The position detecting unit 210 detects information according to a touch position of the user on the operation surface 11 on the basis of a detection result of the operation panel 10. Specifically, the position detecting unit 210 generates, for example, coordinate information that indicates a touch position, and outputs the generated coordinate information to the operation detecting unit 220 and the correction unit 240.

The operation detecting unit 220 detects an input operation performed by the user on the basis of at least one of information according to a touch position detected by the position detecting unit 210 and a depression amount detected by the vibrators 20. For example, the operation detecting unit 220 detects a slide operation performed by the user on the basis of a temporal change in a touch position detected by the position detecting unit 210. When the depression amount exceeds a threshold value, the operation detecting unit 220 detects a depression operation performed by the user. The threshold value that is used by the operation detecting unit 220 in detecting the depression operation is corrected by the correction unit 240 to be mentioned later in accordance with the touch position.

The vibration controlling unit 230 controls the vibrators 20 on the basis of an input operation performed by the user that is detected by the operation detecting unit 220. Specifically, the vibration controlling unit 230 controls the vibrators 20 so as to vibrate the operation panel 10 in a plurality of modes having different vibration frequencies, on the basis of an input operation performed on the operation surface 11.

For example, the vibration controlling unit 230 controls the vibrators 20 so as to switch, on the basis of an input operation performed on the operation surface 11, between a mode for vibrating the operation panel 10 within an ultrasonic band and a mode for vibrating the operation panel 10 within a frequency band that is lower than the ultrasonic band.

The frequency (high frequency) of the above-mentioned ultrasonic band is 20 to 40 kHz, for example, and the frequency (low frequency) lower than the ultrasonic band is approximately 200 Hz, for example; however, not limited thereto.

When the vibration controlling unit 230 controls the vibrators 20 and the vibrators 20 vibrate the operation panel 10 at a high frequency within the ultrasonic band, a standing wave is generated in the operation panel 10. Thus, it is possible to reduce the frictional force between the user and the operation surface 11 by using a squeeze effect.

The squeeze effect indicates a phenomenon that when the vibrators 20 vibrate the operation surface 11 at a high frequency so as to generate a standing wave, an air layer is formed between a finger of the user and the operation surface 11 by pressure fluctuation that is caused by the vibration, and the frictional resistance between the finger of the user and the operation surface 11 becomes relatively low compared with a case without the vibration.

As described above, the frictional force on the operation surface 11 is reduced, so that it is possible to provide to the user a smooth tactual sense as if the finger of the user moving on the operation surface 11 was sucked in a sliding direction of the slide operation, for example.

The vibration controlling unit 230 controls the vibrators 20 to vibrate the operation panel 10 at a low frequency in a state where a finger of the user is in contact with the operation surface 11. Thus, vibration of the vibrators 20 is transmitted to the finger of the user via the operation panel 10 to be able to provide a shaking tactual sense to the user. For example, the vibration controlling unit 230 causes the operation panel 10 to vibrate at a low frequency when the user performs a depression operation, it is possible to inform the user of reception of the depression operation.

The driving voltage controlled by the vibration controlling unit 230 that is for vibrating the vibrators 20 is corrected by the correction unit 240 to be mentioned later in accordance with a touch position.

The correction unit 240 corrects at least one of detection of a touch operation, which is performed by the operation detecting unit 220, and vibration of the operation surface 11 caused by the vibration controlling unit 230. The correction unit 240 includes a threshold-value correcting unit 241 and a vibration correcting unit 242.

The threshold-value correcting unit 241 corrects a threshold value that is used by the operation detecting unit 220 in detecting a depression operation, on the basis of the threshold correcting information 310 stored in the storage 300 and a touch position detected by the position detecting unit 210.

Here, a case in which the user depresses the operation panel 10 by a constant depression amount will be explained with reference to FIG. 4. FIG. 4 is a diagram illustrating a relation between a touch position and a pressing force.

As illustrated in FIG. 4, when a touch position is located substantially in the vicinity of the center of the operation surface 11 and a distance thereof from any of the holding parts 30 is large, the operation panel 10 is easily bent, and thus a finger U1 of the user is to depress the operation panel 10 only with a small force (arrow A1) to depress the operation panel 10 by the constant depression amount.

On the other hand, when a touch position is close to any of the holding parts 30, the operation panel 10 is not easily bent, and thus a finger U2 does not depress the operation panel 10 by the constant depression amount unless the user depresses the operation panel 10 with a large force (arrow A2).

Figure 5:
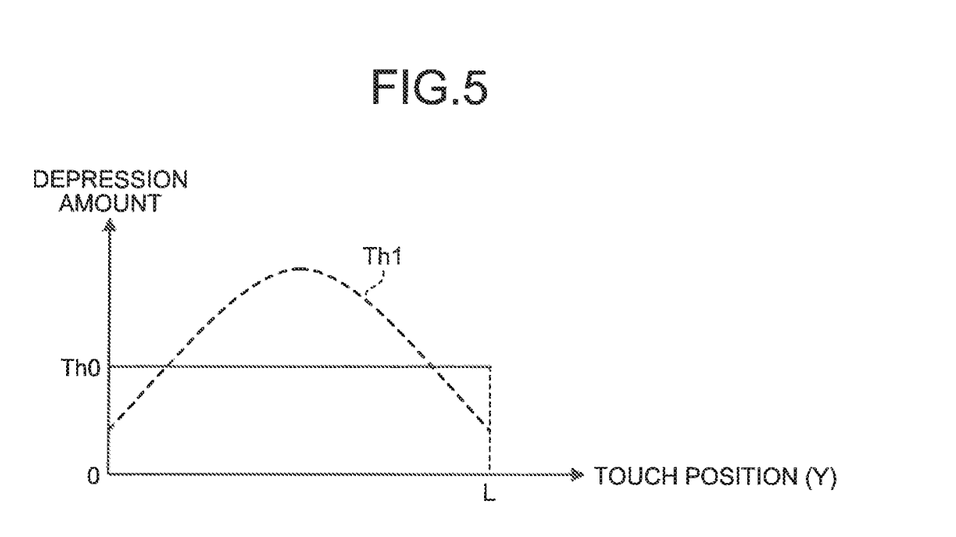
FIG. 5 is a diagram illustrating a threshold value to be used by an operation detecting unit.

Therefore, as indicated in FIG. 5 by using a solid line, when the operation detecting unit 220 detects a depression operation in a state where the depression amount exceeds a constant threshold value Th0, the operation detecting unit 220 does not detect the depression operation unless the user applies larger pressing force as the touch position is closer to any of the holding parts 30. FIG. 5 is a diagram illustrating a threshold value to be used by the operation detecting unit 220, and a lateral axis depicted in FIG. 5 indicates a touch position in the Y-axis direction that is depicted in FIGS. 1A and 1B. Thus, a touch position is closer to the holding part 30 on the left side of FIG. 1B as the touch position is closer to zero, and a touch position is closer to the holding part 30 on the right side of FIG. 1B as the touch position is closer to "L".

The threshold-value correcting unit 241 corrects the threshold value to be used by the operation detecting unit 220 into a threshold value Th1 that is indicated by using a dotted line depicted in FIG. 5. As illustrated in FIG. 5, a value of the threshold value Th1 is smaller as a touch position is closer to any of the holding parts 30, in other words, zero or "L", and the value is larger as a touch position is closer to the center of the operation surface 11.

As described above, the value of the threshold value Th1 is set large in the vicinity of enter of the operation panel 10, which is easily bent, and the value of the threshold value Th1 is set small in the vicinity of any of the holding parts 30, which is not easily bent, it is possible for the operation detecting unit 220 to detect a depression operation when the user presses the operation surface 11 with the constant pressing force.

The threshold value Th1 may be computed by, for example, an experiment, a simulation, etc. as the threshold correcting information 310 and previously stored in the storage 300. In FIG. 5, the threshold correcting information 310 including the threshold value Th1 is depicted as a graph that indicates a relation between a touch position and a corresponding value of the threshold value Th1; however, not limited thereto. For example, the storage 300 may store the threshold correcting information 310 as a map or a graph that indicates the relation between the touch position and the corresponding threshold value Th1. The operation surface 11 may be divided into a plurality of regions and the threshold value Th1 may be set for each of the regions.

In FIG. 5, a value of the threshold value Th1 changes along the Y-axis direction; however, not limited thereto. For example, the value of the threshold value Th1 may change along a direction (X-axis direction) of the long sides 10c of the operation panel 10. This is because, as illustrated in FIG. 1A, the vibrators 20 are arranged in the vicinity of the short sides 10d of the operation panel 10. As described above, arrangement of the vibrators 20 makes the operation panel 10 hard to be bent in the vicinity of the vibrators 20. Thus, when a value of the threshold value Th1 is changed along a direction (X-axis direction) of the long sides 10c, the threshold value can be corrected in accordance with ease of bending the operation panel 10.

The threshold-value correcting unit 241 decides, on the basis of the threshold correcting information 310, the threshold value Th1 at a touch position that is detected by the position detecting unit 210, and outputs the decided threshold value Th1 to the operation detecting unit 220 so as to correct a threshold value to be used in the operation detecting unit 220.

Returning to FIG. 3, the vibration correcting unit 242 corrects a driving voltage to be applied, by the vibration controlling unit 230, to the vibrators 20 on the basis of the driving-voltage correcting information 320 stored in the storage 300 and the touch position detected by the position detecting unit 210.

Figure 6:
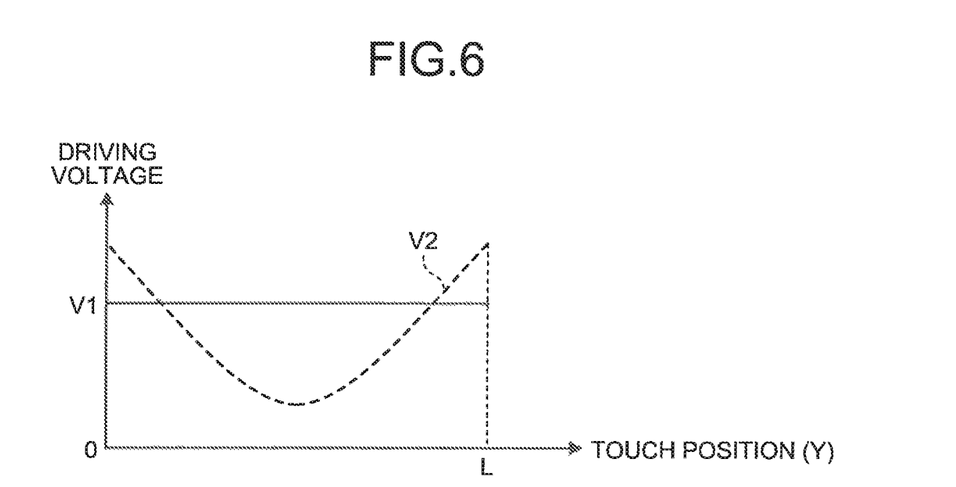
FIG. 6 is a diagram illustrating a driving voltage of a vibration controlling unit.

The holding parts 30 become fixed ends when the operation panel 10 is vibrated, and thus the operation panel 10 is harder to be vibrated as a position on the operation panel 10 is closer to any of the holding parts 30 and is easier to be vibrated as a position on the operation panel 10 is farther from the holding parts 30. Thus, as indicated by a solid line depicted in FIG. 6, in a state where a touch position is close to any of the holding parts 30, the user is hard to feel vibration even when the vibration controlling unit 230 causes the vibrators 20 to vibrate by a constant driving voltage V1. On the other hand, when a touch position is far from the holding parts 30, vibration to be provided to the user is large, and thus there exists possibility that the user feels the vibration unpleasant. FIG. 6 is a diagram illustrating a driving voltage of the vibration controlling unit 230, and a lateral axis depicted in FIG. 6 indicates a touch position in the Y-axis direction that is depicted in FIGS. 1A and 1B. Thus, a touch position is closer to the holding part 30 on the left side of FIG. 1B as the touch position is closer to zero, and a touch position is closer to the holding part 30 on the right side of FIG. 1B as the touch position is closer to "L".

The vibration correcting unit 242 corrects, into a driving voltage V2 that is depicted by using a dotted line illustrated in FIG. 6, a driving voltage in a case where the vibration controlling unit 230 causes the vibrators 20 to vibrate. As illustrated in FIG. 6, a value of the driving voltage V2 is larger as a touch position is closer to any of the holding parts 30, in other words, is closer to zero or "L".

As described above, a value of the driving voltage V2 is set small in the vicinity of the center of the operation panel 10, in which the operation panel 10 is easy to be vibrated, and a value of the driving voltage V2 is set large in the vicinity of any of the holding parts 30, in which the operation panel 10 is hard to be vibrated, so that it is possible to provide a constant vibration to the user.

The driving voltage V2 may be computed by, for example, an experiment, a simulation, etc. as the driving-voltage correcting information 320 and previously stored in the storage 300. In FIG. 6, the driving-voltage correcting information 320 including the driving voltage V2 is depicted as a graph that indicates a relation between a touch position and a corresponding value of the driving voltage V2; however, not limited thereto. For example, the storage 300 may store the driving-voltage correcting information 320 as a map or a graph that indicates the relation between the touch position and the driving voltage V2. The operation surface 11 may be divided into a plurality of regions and the driving voltage V2 may be set for each of the regions.

In FIG. 6, a value of the driving voltage V2 changes along the Y-axis direction; however, not limited thereto. For example, the value of the driving voltage V2 may change along the direction (X-axis direction) of the long sides 10c of the operation panel 10. This is because, as illustrated in FIG. 1A, the vibrators 20 are arranged in the vicinity of the short sides 10d of the operation panel 10. As described above, arrangement of the vibrators 20 changes a vibration mode of the operation panel 10 in the vicinity of the vibrators 20.

Thus, when a value of the driving voltage V2 is changed along the direction (X-axis direction) of the long sides 10c, the threshold value can be corrected in accordance with ease of vibrating the operation panel 10.

As described above, when a value of the driving voltage V2 is changed also along the direction of the long sides 10c, the driving voltage V2 may be changed in accordance with whether or not all of the plurality of vibrators 20 is vibrated, for example. Ease of vibrating the operation surface 11 is different between a case where both of the two vibrators 20 illustrated in FIG. 1A are vibrated and a case where one of the vibrators 20 is vibrated and the other of the vibrators 20 is not vibrated, for example. This is because the vibrators 20 is glued and fixed to the operation surface 11 and thus the vicinity of the vibrator 20 that is not vibrated is hard to be vibrated. Therefore, when the driving voltage V2 is corrected, the driving voltage V2 is corrected in accordance with the vibrator 20 to be vibrated among the plurality of vibrators 20. Thus, it is possible to correct the driving voltage V2 with high accuracy in accordance with a structure of the operation surface 11.

The vibration correcting unit 242 decides, on the basis of the driving-voltage correcting information 320, the driving voltage V2 at a touch position that is detected by the position detecting unit 210, and outputs the decided driving voltage V2 to the vibration controlling unit 230 so as to correct the vibration control on the vibrators 20 performed by the vibration controlling unit 230.

As illustrated in FIGS. 5 and 6, a value of the threshold value Th1 is explained to be larger or a value of the driving voltage V2 is explained to be smaller, as a position on the operation panel 10 is closer to the center of the operation surface 11; however, not limited thereto. The threshold value Th1 and the driving voltage V2 may be decided in accordance with ease of bending or vibrating the operation panel 10. The ease of bending and vibrating the operation panel 10 are changed by a material and a shape of the operation panel 10 or arrangement, a shape, etc. of the holding parts 30. The threshold value Th1 and the driving voltage V2 are values that are changed by distances between the holding parts 30 and a touch position, for example, and are values that are set by an experiment, a simulation, etc. as described above.

As described above, when the threshold value Th1 and the driving voltage V2 are set in accordance with, for example, the distances between the holding parts 30 and a touch position, it is possible to correct with higher accuracy a threshold value to be used by the operation detecting unit 220 and vibration of the vibrators 20 in accordance with ease of bending and vibrating the operation panel 10.

4. Control Process

Figure 7:
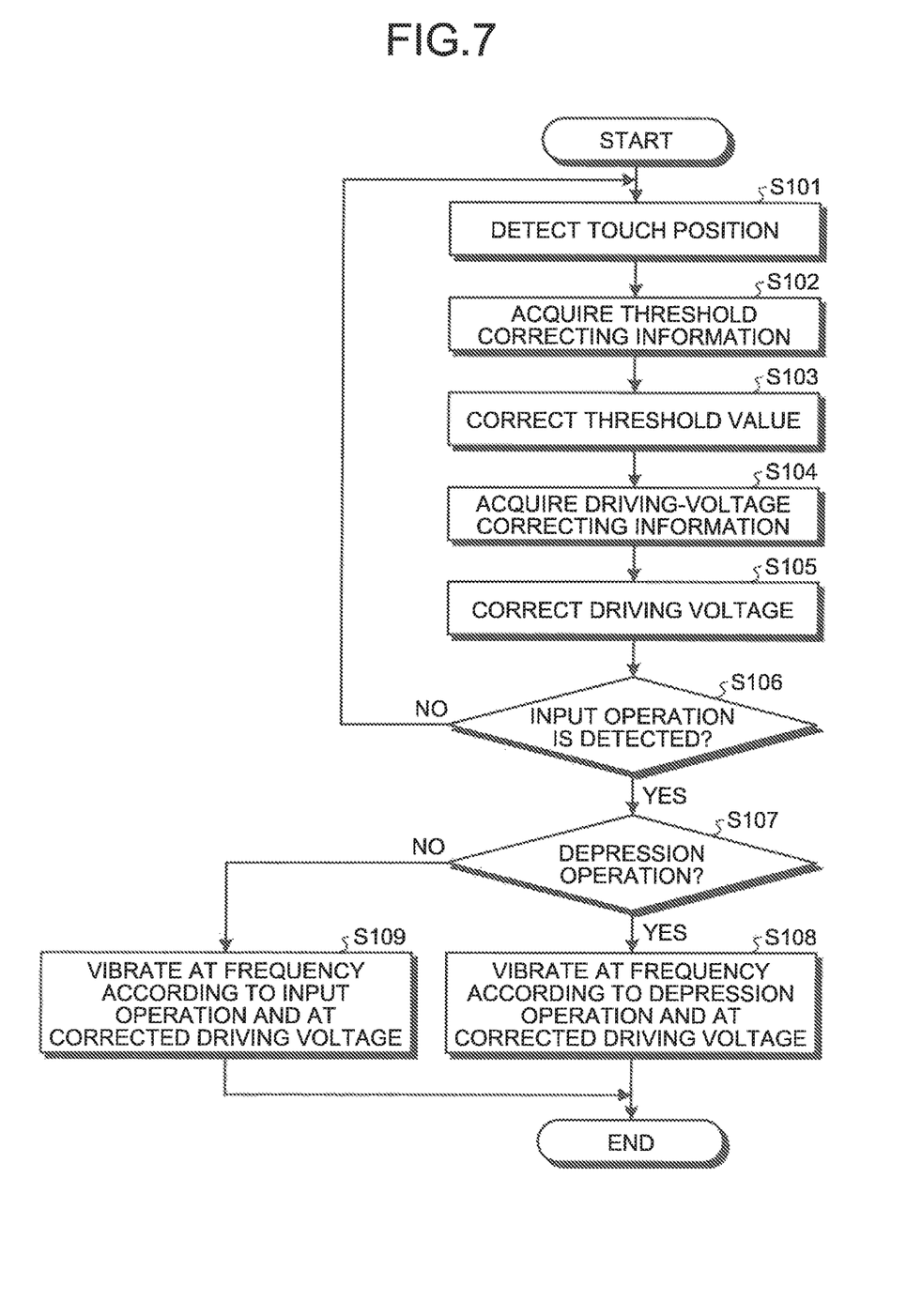
FIG. 7 is a flowchart illustrating a processing procedure to be executed by the input apparatus according to the embodiment.

Next, a processing procedure to be executed by the input apparatus 1 according to the embodiment will be explained with reference to FIG. 7. FIG. 7 is a flowchart illustrating the processing procedure to be executed by the input apparatus 1 according to the embodiment. This processing procedure is repeatedly executed by the control unit 200a of the controller 200.

The position detecting unit 210 of the control unit 200a detects a touch position on the basis of a detection result of the operation panel 10 (Step S101). Next, the threshold-value correcting unit 241 acquires the threshold correcting information 310 from the storage 300 (Step S102), and corrects a threshold value to be used by the operation detecting unit 220 (Step S103).

Subsequently, the vibration correcting unit 242 acquires the driving-voltage correcting information 320 from the storage 300 (Step S104), and corrects a driving voltage to be applied to the vibrators 20, which is controlled by the vibration controlling unit 230 (Step S105).

Next, the control unit 200a determines whether or not the operation detecting unit 220 detects an input operation (Step S106). When the operation detecting unit 220 does not detect any input operation (Step S106: No), the process is returned to Step S101. On the other hand, the operation detecting unit 220 detects an input operation (Step S106: Yes), the control unit 200a determines whether or not the operation detecting unit 220 detects a depression operation (Step S107).

When the operation detecting unit 220 detects a depression operation (Step S107: Yes), the vibration controlling unit 230 causes the vibrators 20 to vibrate at a frequency according to the depression operation and at the driving voltage that is corrected in Step S105 (Step S108). On the other hand, when the operation detecting unit 220 detects no depression operation (Step S107: No), the vibration controlling unit 230 causes the vibrators 20 to vibrate at a frequency according to the input operation detected by the operation detecting unit 220 and at the driving voltage that is corrected in Step S105 (Step S109).

The orders of "Steps S102 and S103" and "Steps S104 and S105" may be exchanged, or the processes of "Steps S102 and S103" and those of "Steps S104 and S105" may be executed simultaneously.

In FIG. 7, it has been described that the position detecting unit 210 detects a touch position, and then the threshold-value correcting unit 241 and the vibration correcting unit 242 respectively corrects the threshold value Th1 and the driving voltage V2; however, not limited thereto. For example, the threshold-value correcting unit 241 and the vibration correcting unit 242 may respectively correct the threshold value Th1 and the driving voltage V2 when a power source of the input apparatus 1 is turned on, or at a timing of its shipping. In this case, the operation detecting unit 220 detects an input operation with reference to the corrected threshold value Th1 and the vibration controlling unit 230 performs the vibration control on the vibrators 20 with reference to the corrected driving voltage V2.

As described above, the controller 200 according to the embodiment includes: the position detecting unit 210; the operation detecting unit 220; the vibration controlling unit 230; and the correction unit 240. The position detecting unit 210 detects a touch position on the operation surface 11. The operation detecting unit 220 detects a touch operation on the operation surface 11. The vibration controlling unit 230 controls and causes one or more vibration elements (vibrators 20) to vibrate the operation surface 11. The correction unit 240 corrects, on the basis of the touch position on the operation surface 11, at least one of detection of the touch operation performed by the operation detecting unit 220 and vibration of the operation surface 11 caused by the vibration controlling unit 230.

Thus, the user is able to perform a depression operation with a constant pressing force independently of his/her touch position on the operation surface 11. Or, the user is able to feel a constant vibration independently of his/her touch position on the operation surface 11. Therefore, by employing the input apparatus 1 according to the embodiment, it is possible to enhance operability of the user.

In the above-mentioned embodiment, it has been described that detection of a depression operation performed by the operation detecting unit 220 and vibration control performed by the vibration controlling unit 230 are corrected on the basis of a touch position on the operation surface 11; however, not limited thereto. For example, the detection of the depression operation performed by the operation detecting unit 220 and the vibration control performed by the vibration controlling unit 230 may be corrected in accordance with a temperature of the operation surface 11 in addition to the touch position. Ease of bending and vibrating the operation panel 10 changes depending on the temperature. Therefore, for example, the peripheral temperature of the input apparatus 1 or the temperature of the operation panel 10 may be detected by a temperature sensor (not illustrated), and the detection of the depression operation performed by the operation detecting unit 220 and the vibration control performed by the vibration controlling unit 230 may be corrected on the basis of the temperature detected by the temperature sensor. Specifically, a map, a graph, or the like that indicates a relation between a touch position and the threshold value Th1 or the driving voltage V2 for each temperature of the operation surface 11 may be stored in the storage 300 as the threshold correcting information 310 or the driving-voltage correcting information 320. The correction unit 240 corrects the threshold value Th1 or the driving voltage V2 with reference to the threshold correcting information 310 or the driving-voltage correcting information 320 according to the temperature detected by the temperature sensor.

As described above, when the peripheral temperature of the input apparatus 1 or the like is detected, the correction unit 240 is able to perform the correction in accordance with the temperature of the operation surface 11, so that it is possible for the correction unit 240 to perform the correction with higher accuracy.

Furthermore, there exists a case where ease of bending and/or vibrating the operation panel 10 are changed by the aged deterioration. Thus, for example, the detection of the depression operation performed by the operation detecting unit 220 and the vibration control performed by the vibration controlling unit 230 may be corrected in accordance with the time passage. For example, the input apparatus 1 may count an elapsed time interval from its shipping (not illustrated), and may correct the detection of the depression operation performed by the operation detecting unit 220 and the vibration control performed by the vibration controlling unit 230 on the basis of the counted elapsed time interval. Specifically, a map, a graph, or the like that indicates a relation between a touch position and the threshold value Th1 or the driving voltage V2 for each elapsed time interval may be stored in the storage 300 as the threshold correcting information 310 or the driving-voltage correcting information 320. The correction unit 240 corrects the threshold value Th1 or the driving voltage V2 with reference to the threshold correcting information 310 or the driving-voltage correcting information 320 according to the elapsed time interval counted by the timer.

Thus, it is possible to correct the detection of the depression operation performed by the operation detecting unit 220 and the vibration control performed by the vibration controlling unit 230 in accordance with a change in the operation panel 10 due to the aged deterioration, so that it is possible to improve accuracy in the correction performed by the correction unit 240.

In the above-mentioned embodiment, the driving voltage V2, which is a correction target, has been described to be set independently of a vibration frequency of the vibrators 20; however, not limited thereto. For example, there exists possibility that ease of vibrating the operation panel 10 may differ between a case where the vibrators 20 are vibrated at a high frequency and a case where the vibrators 20 are vibrated at a low frequency. Thus, the driving voltage V2, which is a correction target, may be set for each mode in which the vibrators 20 are vibrated.

Thus, the driving voltage of the vibrators 20 able to be corrected for each mode in which the vibrators 20 are vibrated, so that it is possible to provide a constant vibration to the user independently of a touch position even when vibration frequencies generated by the vibrators 20 are different from each other.

In the above-mentioned embodiment, the storage 300 has been described to store the threshold correcting information 310 and the driving-voltage correcting information 320; however, not limited thereto. For example, the storage 300 may store information on values that indicate ease of bending (or ease of vibrating) the operation surface 11. In this case, for example, the correction unit 240 multiplies the threshold value by the value when correcting the threshold value, and the correction unit 240 divides the driving voltage by the value when correcting the driving voltage so as to correct the threshold value and the driving voltage. The operations executed by the correction unit 240 are merely examples, and it is sufficient that an operation according to a value included in the information stored in the storage 300 is executed.

As described above, the correction unit 240 corrects the threshold value and the driving voltage by using one piece of information, so that it is possible to reduce information amount stored in the storage 300.

According to one aspect of the embodiment, it is possible to enhance operability of the user.

Although the invention has been described with respect to specific embodiments for a complete and clear disclosure, the appended claims are not to be thus limited but are be construed as embodying all modifications and alternative constructions that may occur to one skilled in the art that fairly fall within the basic teaching herein set forth.

What is claimed is:

1. A controller comprising:
   a processor programmed to:
   detect a touch position on an operation surface;
   detect a touch operation on the operation surface;
   control and cause one or more vibrators to vibrate the operation surface; and
   adjust, in accordance with a distance between a holding part that holds the operation surface and the detected touch position, vibration of the operation surface to reduce a difference in the vibration of the operation surface due to the distance between the holding part and the detected touch position.

2. The controller according to claim 1, wherein the processor is further programmed to:
   adjust, based on the touch position according to a structure of an operation panel including the operation surface, the vibration of the operation surface.

3. The controller according to claim 1, wherein the processor is further programmed to:
   adjust the vibration of the operation surface so that the vibration is larger as the touch position is closer to the holding part.

4. The controller according to claim 1, wherein the processor is further programmed to:
   detect a depression operation against the operation surface when the operation surface is depressed by a depression amount having a threshold value or more; and
   adjust the threshold value so that the threshold value is smaller as the touch position is closer to the holding part.

5. The controller according to claim 1, wherein the processor is further programmed to:
   adjust, in accordance with a temperature of the operation surface, the vibration of the operation surface.

6. The controller according to claim 1, wherein the processor is further programmed to:
   adjust, in accordance with a time passage, the vibration of the operation surface.

7. A control method comprising:
   detecting a touch position on an operation surface;
   detecting a touch operation on the operation surface;
   controlling and causing one or more vibrators to vibrate the operation surface; and
   adjusting, in accordance with a distance between a holding part that holds the operation surface and the detected touch position, vibration of the operation surface to reduce a difference in the vibration of the operation surface due to the distance between the holding part and the detected touch position.

8. An input apparatus comprising:
   one or more vibrators that vibrate an operation surface; and
   a processor programmed to:
   detect a touch position on the operation surface;
   detect a touch operation on the operation surface;
   control and cause the one or more vibrators to vibrate the operation surface; and
   adjust, in accordance with a distance between a holding part that holds the operation surface and the detected touch position, vibration of the operation surface to reduce a difference in the vibration of the operation surface due to the distance between the holding part that holds the operation surface and the detected touch position.

9. A controller comprising:
   a processor programmed to:
   detect a touch position on an operation surface;
   detect a touch operation on the operation surface;
   control and cause one or more vibrators to vibrate the operation surface; and
   correct, in accordance with a distance between a holding part that holds the operation surface and the detected touch position, at least one detection of the touch operation and vibration of the operation surface, wherein
   the processor is further programmed to:
   correct the vibration of the operation surface such that vibration of the operation surface at the detected touch position is constant independent of a position of the detected touch position on the operation surface.

10. The controller according to claim 9, wherein the processor is further programmed to:
    correct, based on the touch position according to a structure of an operation panel including the operation surface, the at least one of detection of the touch operation and vibration of the operation surface.

11. The controller according to claim 9, wherein the processor is further programmed to:
    correct the vibration of the operation surface so that the vibration is larger as the touch position is closer to the holding part.

12. The controller according to claim 9, wherein the processor is further programmed to:

detect a depression operation against the operation surface when the operation surface is depressed by a depression amount having a threshold value or more; and correct the threshold value so that the threshold value is smaller as the touch position is closer to the holding part.

13. The controller according to claim 9, wherein the processor is further programmed to:

correct, in accordance with a temperature of the operation surface, the at least one of detection of the touch operation and vibration of the operation surface.

14. The controller according to claim 9, wherein the processor is further programmed to:

correct, in accordance with a time passage, the at least one of detection of the touch operation and vibration of the operation surface.

15. A controller comprising:

a processor programmed to:

detect a touch position on an operation surface;

detect a touch operation on the operation surface;

control and cause one or more vibrators to vibrate the operation surface; and adjust, in accordance with a distance between a holding part that holds the operation surface and the detected touch position, vibration of the operation surface to reduce a difference in the vibration that a user feels during the touch operation due to the distance between the location of the touch position on the operation surface and the holding part.

16. The controller according to claim 1, wherein the one or more vibrators are attached to the operation surface but not to the holding part.

17. The controller according to claim 1, wherein the one or more vibrators impart a vibration force on the operation surface that is transverse to the operation surface.

18. The controller according to claim 1, wherein energy supplied to the one or more vibrators varies depending on the distance between the holding part and the detected touch position.

* * * * *